US 11,780,069 B2

(12) United States Patent
Iida et al.

(10) Patent No.: US 11,780,069 B2
(45) Date of Patent: Oct. 10, 2023

(54) DUST COLLECTING SYSTEM

(71) Applicant: MAKITA CORPORATION, Anjo (JP)

(72) Inventors: Hitoshi Iida, Anjo (JP); Yoshiro Tada, Anjo (JP); Hideki Tsuji, Anjo (JP); Taro Hisano, Anjo (JP)

(73) Assignee: MAKITA CORPORATION, Anjo (JP)

( * ) Notice: Subject to any disclaimer, the term of this patent is extended or adjusted under 35 U.S.C. 154(b) by 622 days.

(21) Appl. No.: 16/831,343

(22) Filed: Mar. 26, 2020

(65) Prior Publication Data

US 2020/0306904 A1 Oct. 1, 2020

(30) Foreign Application Priority Data

Mar. 26, 2019 (JP) .................................. 2019-059377

(51) Int. Cl.
*B25D 17/20* (2006.01)
*B23Q 11/00* (2006.01)
*B25F 5/00* (2006.01)

(52) U.S. Cl.
CPC .......... *B25D 17/20* (2013.01); *B23Q 11/0046* (2013.01); *B23Q 11/0071* (2013.01); *B25F 5/00* (2013.01); *B23Q 2705/06* (2013.01); *B25D 2217/0057* (2013.01)

(58) Field of Classification Search
CPC ............. B23Q 17/007; B23Q 11/0071; B23Q 11/0046; B01D 29/72
See application file for complete search history.

(56) References Cited

U.S. PATENT DOCUMENTS

| 2010/0197211 A1 | 8/2010 | Guth |
| 2013/0031881 A1 | 2/2013 | Machida et al. |
| 2013/0136549 A1* | 5/2013 | Appel ................ B23Q 11/0046 408/56 |

(Continued)

FOREIGN PATENT DOCUMENTS

| CN | 200954623 Y | 10/2007 |
| CN | 205349271 U | 6/2016 |

(Continued)

OTHER PUBLICATIONS

Apr. 12, 2022 Non-Final Office Action Issued in U.S. Appl. No. 16/830,455.

(Continued)

*Primary Examiner* — Daniel Jeremy Leeds
(74) *Attorney, Agent, or Firm* — Oliff PLC (57) ABSTRACT

A dust collecting system includes a power tool and a dust collector. The power tool is configured to perform processing operation on a workpiece by driving a tool accessory. The dust collector is configured to collect dust generated by the processing operation. The power tool includes a first motor and a driving mechanism configured to drive the tool accessory by power of the first motor. The dust collector includes a second motor and a fan configured to be rotationally driven by the second motor to generate air flow for collecting dust. The dust collecting system includes a first control device configured to control a rotation speed of the second motor according to a driving state of the power tool.

14 Claims, 8 Drawing Sheets

(56) References Cited

U.S. PATENT DOCUMENTS

| | | | |
|---|---|---|---|
| 2015/0040341 A1 | 2/2015 | Wiedemann et al. | |
| 2016/0100724 A1 | 4/2016 | Valentini | |
| 2016/0151846 A1* | 6/2016 | Suzuki | B24B 23/028 340/12.5 |
| 2017/0232565 A1 | 8/2017 | Machida | |
| 2018/0099391 A1 | 4/2018 | Umemoto et al. | |
| 2019/0030669 A1 | 1/2019 | Wu | |
| 2019/0358758 A1* | 11/2019 | Ullrich | B25F 5/02 |

FOREIGN PATENT DOCUMENTS

| | | |
|---|---|---|
| DE | 102012003073 A1 | 8/2013 |
| DE | 102017131459 A1 | 12/2018 |
| JP | S62-236673 A | 10/1987 |
| JP | H03-128625 A | 5/1991 |
| JP | 2004-195565 A | 7/2004 |
| JP | 2013-230510 A | 11/2013 |
| JP | 2018-058188 A | 4/2018 |
| JP | 2019-209390 A | 12/2019 |
| WO | 2016152921 A1 | 9/2016 |
| WO | 2018/180896 A1 | 10/2018 |

OTHER PUBLICATIONS

Jul. 22, 2022 Notice of Allowance Issued In U.S. Appl. No. 16/830,455.

U.S. Appl. No. 16/830,455 filed in the name of Hitoshi Iida et al. filed Mar. 26, 2020.

Aug. 16, 2022 Office Action issued in Japanese Patent Application No. 2019-059377.

Mar. 30, 2023 Office Action issued in Chinese Patent Application No. 201911377415.X.

* cited by examiner

DUST COLLECTING SYSTEM

CROSS-REFERENCE TO RELATED APPLICATION

The present application claims priority to Japanese patent application No. 2019-59377 filed on Mar. 26, 2019, contents of which are fully incorporated herein by reference.

TECHNICAL FIELD

The present disclosure relates to a dust collecting system that includes a power tool and a dust collector.

BACKGROUND ART

A dust collecting system is known which includes a power tool configured to perform processing operation on a workpiece by driving a tool accessory and a dust collector configured to be attached to the power tool and to collect dust generated by the processing operation. In some such dust collecting systems, a motor for driving a tool accessory (also referred to as a driving motor) is provided in the power tool, while a motor for driving a dust collection fan (also referred to as a dust-collection motor) is provided in the dust collector (see, for example, Japanese non-examined laid-open patent publication No. 2018-58188).

SUMMARY

The present disclosure provides a dust collecting system which includes a power tool and a dust collector. The power tool is configured to perform processing operation on a workpiece by driving a tool accessory. The dust collector is configured to collect dust generated by the processing operation.

The power tool includes a first motor and a driving mechanism. The driving mechanism is configured to drive the tool accessory by power of the first motor. The dust collector includes a second motor and a fan. The fan is configured to be rotationally driven by the second motor to generate air flow for collecting dust. Further, the dust collecting system includes a first control device configured to control a rotation speed of the second motor according to a driving state of the power tool. The first control device may be provided in either the power tool or the dust collector.

The driving state of the power tool may refer to, for example, a driving state (such as whether being driven or not, rotation speed etc.) of the first motor or the driving mechanism, or a motion state (such as a vibration state and a rotation state) of the power tool.

DETAILED DESCRIPTION OF THE EMBODIMENTS

Figure 1:
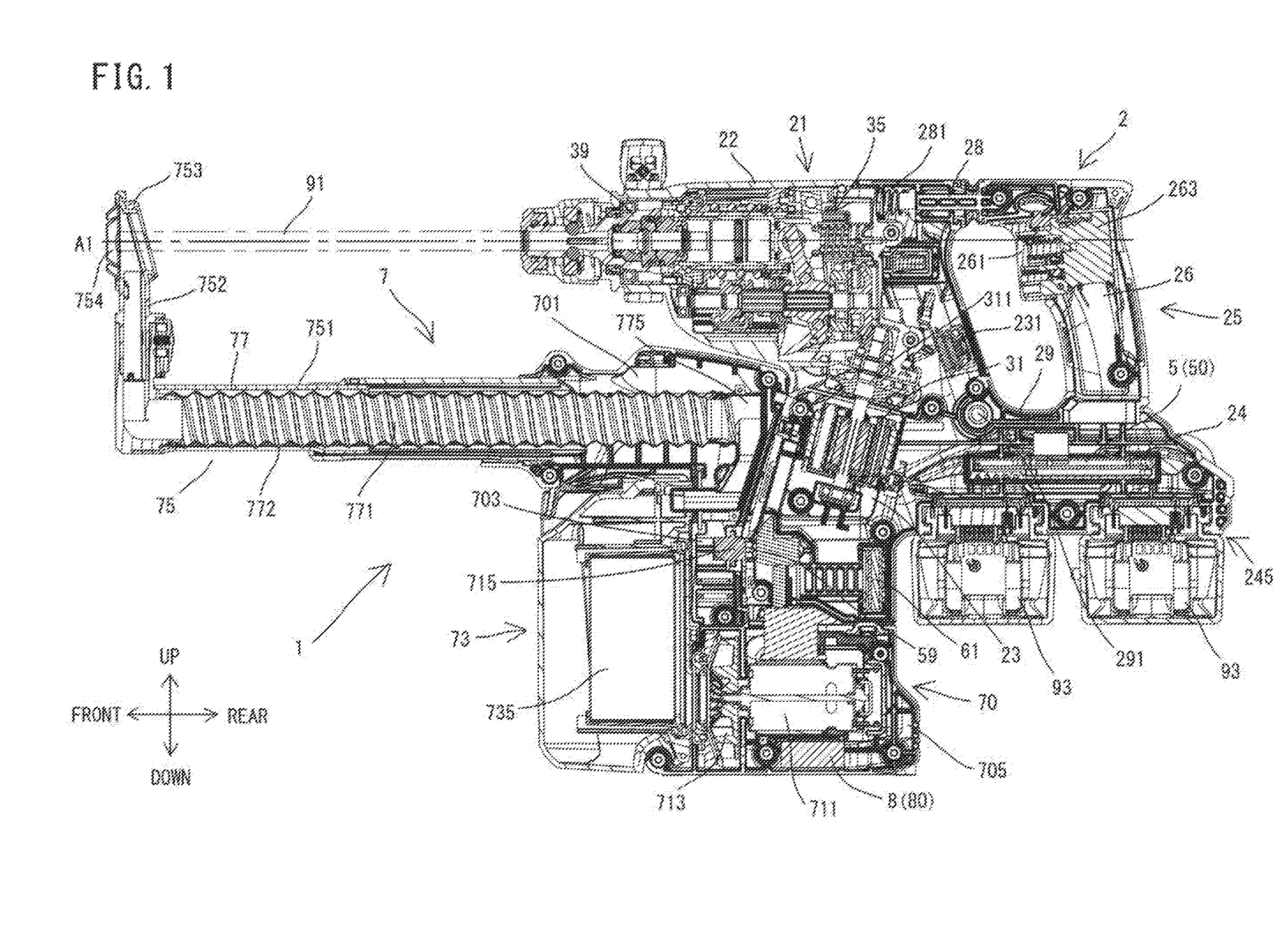
FIG. 1 is a sectional view showing a dust collecting system.

A dust collecting system 1 according to an embodiment of the present disclosure is now described with reference to the drawings. As shown in FIG. 1, the dust collecting system 1 of the present embodiment includes a hammer drill 2 and a dust collector 7. The hammer drill 2 is configured to perform processing operation (such as chipping operation and drilling operation) by driving a removably coupled tool accessory 91 by power of a motor 31. More specifically, the hammer drill 2 is configured to perform hammering motion of linearly driving the tool accessory 91 along a driving axis A1, and drilling motion of rotationally driving the tool accessory 91 around the driving axis A1. The chipping operation is performed by the hammering motion and the drilling operation is performed by the drilling motion. Further, the dust collector 7 is configured to be removably attached to the hammer drill 2 and to collect dust generated by the processing operation.

First, the general structure of the hammer drill 2 is described with reference to FIG. 1.

As shown in FIG. 1, an outer shell of the hammer drill 2 is mainly formed by a body housing 21 and a handle 25. The body housing 21 includes a driving-mechanism-housing part 22 which houses a driving mechanism 35, a motor-housing part 23 which houses the driving motor 31, and a controller-housing part 24. The body housing 21 is generally Z-shaped in a side view as a whole.

The driving-mechanism-housing part 22 is formed as an elongate box-like body and extends along the driving axis A1. A tool holder 39, to which the tool accessory 91 can be removably coupled, is disposed within one end portion of the driving-mechanism-housing part 22 in a driving-axis-A1 direction. The motor-housing part 23 is formed as an elongate box-like body and protrudes in a direction away from the driving axis A1 from the other end portion of the driving-mechanism-housing part 22 in the driving-axis-A1 direction. The driving motor 31 is disposed within the motor-housing part 23 such that a rotation axis of a motor shaft 311 extends in a direction which intersects the driving axis A1 (specifically, in a direction which is oblique to the driving axis A1).

In the following description, for convenience sake, an axial direction of the driving axis A1 (also referred to as the driving-axis-A1 direction) is defined as a front-rear direction of the hammer drill 2. In the front-rear direction, the one end side on which the tool holder 39 is provided is defined as a front side (also referred to as a front end region side) of the hammer drill 2, while its opposite side is defined as a rear side. Further, a direction which is orthogonal to the driving axis A1 and which corresponds to an axial direction of the rotation axis of the motor shaft 311 is defined as an up-down direction of the hammer drill 2. In the up-down direction, a direction toward which the motor-housing part 23 protrudes is defined as a downward direction, while its opposite direction is defined as an upward direction. Furthermore, a direction which is orthogonal to the front-rear direction and the up-down direction is defined as a left-right direction.

The controller-housing part 24 is a rectangular box-like portion of the body housing 21 which extends rearward from a generally central portion (where a body of the driving motor 31 is housed) of the motor-housing part 23 in the up-down direction. A controller 5 is housed in the controller-housing part 24. Two battery-mounting parts 245, each of which is configured to receive a battery 93, are provided side by side in the front-rear direction on a lower end portion (on the lower side of the controller 5) of the controller-housing part 24. In the present embodiment, the hammer drill 2 and the dust collector 7 are configured to operate with electric power which is supplied from the batteries 93.

The handle 25 is generally C-shaped in a side view as a whole. Both ends of the handle 25 are connected to a rear end portion of the body housing 21. The handle 25 includes a grip part 26 to be held by a user. The grip part 26 is arranged apart rearward from the body housing 21 and extends generally in the up-down direction, crossing the driving axis A1. A trigger 261 is provided on a front side of an upper end portion of the grip part 26. The trigger 261 is configured to be depressed by a user.

The detailed physical structure of the hammer drill 2 is now described.

First, the body housing 21 and its internal structure are described.

As shown in FIG. 1, the driving mechanism 35 is housed in the driving-mechanism-housing part 22. The driving mechanism 35 is configured to drive the tool accessory 91 by power of the driving motor 31. In the present embodiment, the driving mechanism 35 includes a motion-converting mechanism, a striking mechanism and a rotation-transmitting mechanism. The motion-converting mechanism is configured to convert rotation of the motor shaft 311 into linear motion and transmit it to the striking mechanism. In the present embodiment, the motion-converting mechanism is of a type using a swinging member. The striking mechanism is configured to linearly operate to strike the tool accessory 91, thus linearly driving the tool accessory 91 along the driving axis A1. In the present embodiment, the striking mechanism includes a striker and an impact bolt. The rotation-transmitting mechanism is configured to decelerate rotation of the motor shaft 311 and then transmit it to the tool holder 39, thus rotationally driving the tool accessory 91. The rotation-transmitting mechanism includes a plurality of gears. An operation mode of the hammer drill 2 may be switched (among a hammer drill mode, a drill mode and a hammer mode) by a mode-switching mechanism (not shown). The mode-switching mechanism may appropriately interrupt power transmission in the motion-converting mechanism or in the rotation-transmitting mechanism, according to a user's operation of a mode-switching dial (not shown). The structures of the driving mechanism 35 and the mode-switching mechanism are known and therefore not described in detail.

As described above, the motor-housing part 23 is connected to a rear end portion of the driving-mechanism-housing part 22 and extends downward. The driving motor 31 is housed in an upper portion of the motor-housing part 23. In the present embodiment, a direct current (DC) brushless motor is adopted as the driving motor 31. The driving motor 31 includes a motor body, which includes a stator and a rotor, and a motor shaft 311, which extends from the rotor and rotates together with the rotor. The rotation axis of the motor shaft 311 extends obliquely downward and forward relative to the driving axis A1.

A speed-change-dial unit 231 is housed in a rear upper end portion of the motor-housing part 23. Although not shown in detail, the speed-change-dial unit 231 includes a dial, which can be turned from the outside of the motor-housing part 23 by a user, and a variable resistor mounted on a circuit board. The dial is an operation member which may be operated by the user to set the rotation speed of the driving motor 31. The variable resistor outputs a resistance value corresponding to the turning position of the dial. The speed-change-dial unit 231 is connected to the controller 5 via a wiring (not shown) and configured to output to the controller 5 a signal which indicates a resistance value (i.e. set rotation speed) corresponding to the turning operation of the dial.

An acceleration sensor unit 61 is supported in a rear portion of a lower portion (below the driving motor 31) of the motor-housing part 23. Although not shown in detail, the acceleration sensor unit 61 includes a case, a board housed in the case, and a control circuit 610 and an acceleration sensor 611 (see FIG. 2) which are mounted on the board. The acceleration sensor 611 is configured to detect acceleration as a physical quantity which indicates vibration of the body housing 21. The control circuit 610 is configured to determine whether the vibration (acceleration) detected by the acceleration sensor 611 exceeds a specified threshold, and to output a signal corresponding to the determination result (hereinafter referred to as an acceleration signal) to the controller 5 via a wiring (not shown).

Further, a recess for fixing the dust collector 7 is provided in a front end portion of a lower portion of the motor-housing part 23. A connector 59 is provided in this recess and configured to be electrically connected to a connector 715 of the dust collector 7.

The controller 5 is housed in the controller-housing part 24. Although not shown in detail, the controller 5 includes a case, a board housed in the case and a control circuit 50 (see FIG. 2) mounted on the board. In the present embodiment, the controller 5 is configured to control driving of the driving motor 31 based on the rotation speed set with the speed-change-dial unit 231, the operation state of the trigger 261 and the vibration of the body housing 21, which will be described below in detail.

Next, the handle 25 and its internal structure are described.

As shown in FIG. 1, the handle 25 includes the grip part 26, an upper connection part 28 and a lower connection part 29. As described above, the grip part 26 is arranged to extend in the up-down direction and the trigger 261 is provided on the front side of the upper end portion of the grip part 26. The grip part 26 has an elongate cylindrical shape and houses a switch 263 inside. The switch 263 is normally kept in an OFF state and turned ON in response to an operation of depressing the trigger 261. Thus, the switch 263 is configured to detect depressing and releasing of the trigger 261. Further, the switch 263 is connected to the controller 5 (specifically, the control circuit 50) via a wiring (not shown), and outputs a signal corresponding to the operation amount of the trigger 261 (hereinafter referred to as a trigger signal) to the controller 5 when the switch 263 is in the ON state. The upper connection part 28 extends forward from an upper end portion of the grip part 26 and is connected to an upper rear end portion of the body housing 21. The lower connection part 29 extends forward from a lower end portion of the grip part 26 and is connected to a central portion of the rear end portion of the body housing 21. Further, the lower connection part 29 is disposed on the upper side of the controller-housing part 24.

In the present embodiment, the handle 25 is elastically connected to the body housing 21 so as to be movable relative to the body housing 21. More specifically, an elastic member 281 is disposed between a front end portion of the upper connection part 28 and a rear end portion of the driving-mechanism-housing part 22. The lower connection part 29 is pivotally supported by the motor-housing part 23 via a support shaft 291 extending in the left-right direction. By provision of such a structure, transmission of vibration from the body housing 21 to the handle 25 (the grip part 26) can be suppressed.

Next, the dust collector 7 is described. The dust collector 7 is used in a state in which the dust collector 7 is attached to the hammer drill 2. Therefore, in the following description, for convenience sake, directions of the dust collector 7 are defined corresponding to the directions of the hammer drill 2 with the dust collector 7 attached thereto.

First, the general structure of the dust collector 7 is described. As shown in FIG. 1, the dust collector 7 includes a body housing 70, a dust case 73, a sliding part 75 and a dust-transfer passage 77. The body housing 70 is configured to be removably attached to the body housing 21 of the hammer drill 2. The body housing 70 houses a dust-collection motor 711 and a fan 713. The fan 713 is configured to be rotationally driven by the dust-collection motor 711 to generate air flow for collecting dust. The dust case 73 is a container for storing dust. The dust case 73 is removably mounted to the body housing 70. The sliding part 75 is held by the body housing 70 so as to be slidable in the front-rear direction. Further, the sliding part 75 has a cover part 753. The cover part 753 has a suction port 754 for sucking dust and is configured to cover a tip end of the tool accessory 91. The dust-transfer passage 77 is a passage through which dust sucked from the suction port 754 is transferred. The dust-transfer passage 77 extends through the inside of the sliding part 75 and is connected to the dust case 73.

When the dust-collection motor 711 is driven and the fan 713 is rotated, dust generated by the processing operation is sucked in through the suction port 754 together with air and led into the dust case 73 through the dust-transfer passage 77. In the dust case 73, only the dust is separated from the air by a filter 735 and stored. The air from which the dust has been separated is discharged from an outlet (not shown) formed in the body housing 70. Thus, in the dust collecting system 1, the dust collector 7 collects the dust generated by the processing operation using the hammer drill 2.

The detailed structure of the dust collector 7 is now described.

As shown in FIG. 1, the body housing 70 is a hollow body which is generally Z-shaped in a side view. The body housing 70 includes a sliding-guide part 701, a connector part 703 and a motor-housing part 705.

The sliding-guide part 701 is a rectangular box-like portion forming an upper end portion of the body housing 70. The sliding-guide part 701 has an internal space extending in the front-rear direction. An opening is provided at a front end of the sliding-guide part 701 to provide communication between the internal space and the outside. A structure for holding the sliding part 75 such that the sliding part 75 is slidable in the front-rear direction is provided in the inside of the sliding-guide part 701, which is a well-known structure and therefore is not described in detail and not shown in the drawings.

The connector part 703 is provided on the lower side of a rear end portion of the sliding-guide part 701 and extends in the up-down direction. A rear wall of the connector part 703 has a protruding portion protruding rearward. The connector 715 is provided in this protruding portion to be electrically connected to the connector 59 of the hammer drill 2.

The motor-housing part 705 is a rectangular box-like portion provided on the lower side of the connector part 703 and extending rearward of the connector part 703, and forms a lower end portion of the body housing 70. A pair of guide rails, which extend in the front-rear direction, are respectively formed on upper ends of left and right sides of the motor-housing part 705 Correspondingly, a pair of guide grooves, which extend in the front-rear direction, are respectively provided in lower end portions of left and right sides of the motor-housing part 23 of the hammer drill 2. The guide rails and the guide grooves have a well-known structure and therefore are not described in detail here and not shown in the drawings. The dust collector 7 is configured to be attached to the body housing 21 of the hammer drill 2 via slide engagement between the guide rails and the guide grooves. Further, when the dust collector 7 is attached to the body housing 21, the protruding portion of the connector 703 is fitted in the recess of the motor-housing part 23 and the connector 715 is electrically connected to the connector 59.

The motor-housing part 705 houses the dust-collection motor 711, the fan 713 and a controller 8. More specifically, the dust-collection motor 711 is arranged such that its motor shaft extends in the front-rear direction. In the present embodiment, a motor with a brush is used as the dust-collection motor 711. The fan 713 is fixed to the motor shaft in front of a motor body (a stator and a rotor) of the dust-collection motor 711 and rotates together with the motor shaft. The fan 713 is a centrifugal fan. An opening is formed in a front wall of the motor-housing part 705 so as to face a suction area of the fan 713. Although not shown in detail, the controller 8 includes a case, a board housed in the case and a control circuit 80 (see FIG. 2) mounted on the board. When the dust collector 7 is attached to the body housing 21 as described above, the controller 8 is connected to the controller 5 of the hammer drill 2 via the connectors 715 and 59. In the present embodiment, the controller 8 is configured to control driving of the dust-collection motor 711 based on the operation state of the trigger 261 and the driving state of the hammer drill 2, which will be described below in detail.

As shown in FIG. 1, the dust case 73 is a rectangular box-like container. The dust case 73 has an inlet, through which dust-containing air flows in, and an outlet, through which air from which dust has been separated, flows out. The outlet communicates with the opening of the motor-housing part 705 which is formed in front of the fan 713. The filter 735 is disposed within the dust case 73. The air which has passed through the filter 735 flows out of the dust case 73 into the motor-housing part 705 via the outlet and is discharged to the outside of the dust collector 7 from a discharge outlet (not shown).

As shown in FIG. 1, the sliding part 75 is a tubular member which is generally L-shaped in a side view as a whole. The sliding part 75 includes a first tubular part 751 linearly extending in the front-rear direction and a second tubular part 752 extending upward from a front end portion of the first tubular part 751. The cover part 753 is provided on an upper end of the second tubular part 752 and configured to cover the tip end of the tool accessory 91. The suction port 754 extends through the cover part 753 in the front-rear direction. The sliding part 75 is held by the body housing 70 such that a portion of the first tubular part 751 is always located within the sliding-guide part 701 while the second tubular part 752 (including the cover part 753) protrudes forward from the sliding-guide part 701.

As shown in FIG. 1, the dust-transfer passage 77 extends through the inside of the sliding part 75 and connects the suction port 754 and the inlet of the dust case 73. The dust sucked in from the suction port 754 is transferred to the dust case 73 through the dust-transfer passage 77. In the present embodiment, the dust-transfer passage 77 is defined by a portion (the second tubular part 752) of the sliding part 75, a hose 771 and a hose-connecting part 775. The hose 771 is formed in a bellows shape to be extensible. One end of the hose 771 is connected to a lower end portion of the second tubular part 752. The other end of the hose 771 protrudes rearward from a rear end of the sliding part 75 and is connected to one end portion of the hose-connecting part 775. The other end portion of the hose-connecting part 775 is inserted into the dust case 73 through the inlet. With this structure, the dust-transfer passage 77 is formed to connect the suction port 754 and the dust case 73.

Further, a spring 772 is fitted on the hose 771. In the present embodiment, a compression coil spring is adopted as the spring 772. The sliding part 75 is always biased forward, that is, in a direction to protrude from the body housing 70 by the elastic force of the spring 772. Therefore, the sliding part 45 is held in an initial position (shown in FIG. 1) while no external force is applied rearward to the sliding part 75 (hereinafter also referred to as an initial state). When the processing operation (such as the drilling operation) is performed with the tip end of the tool accessory 91 and the cover part 753 pressed against a workpiece, the sliding part 75 is pushed into the inside of the body housing 70 against the biasing force of the spring 772 as the processing operation proceeds. When the processing operation is completed and the pressing operation is released, the sliding part 75 returns to the initial position by the elastic force of the spring 772.

Figure 2:
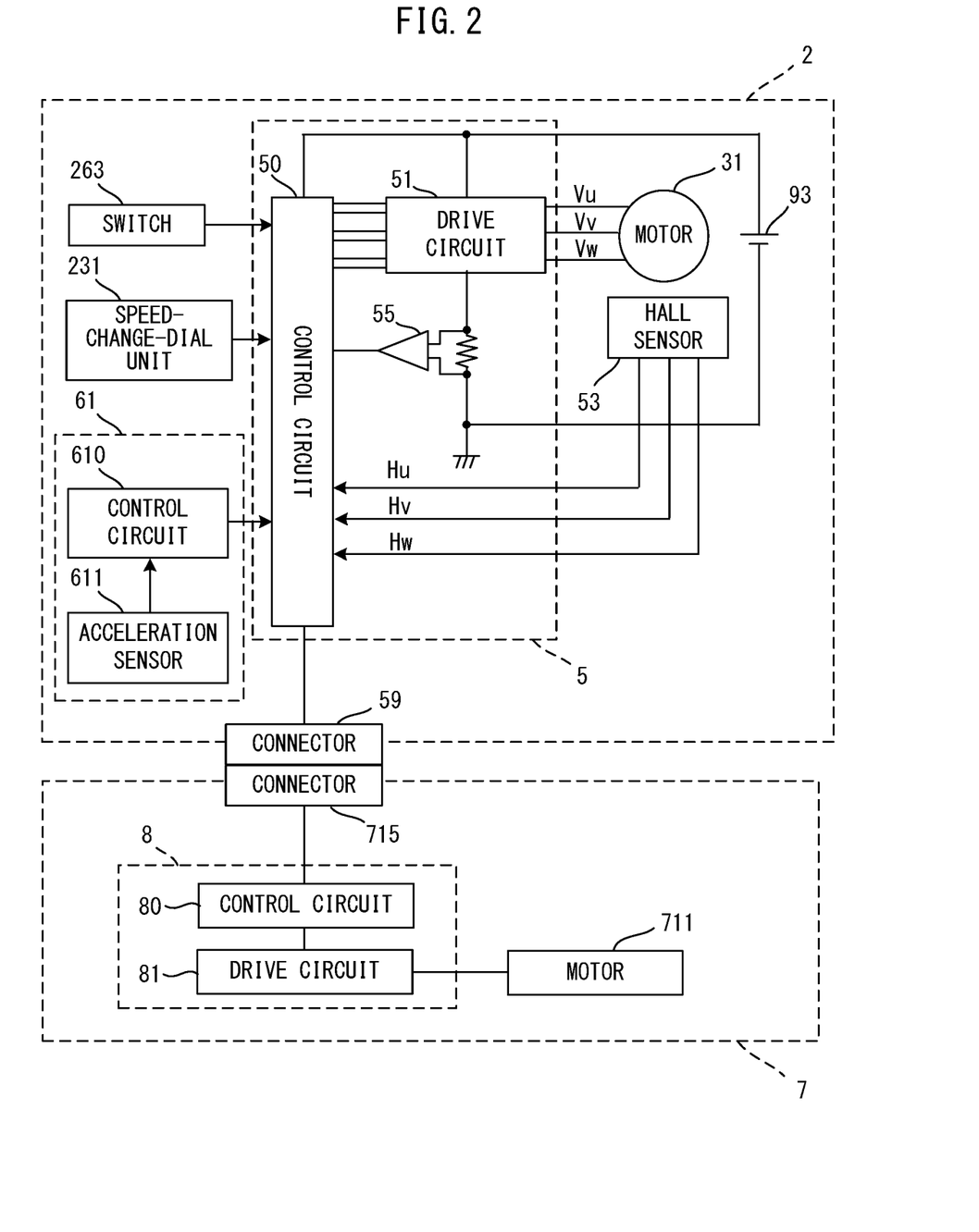
FIG. 2 is a block diagram showing the electrical configuration of the dust collecting system.

The electrical configurations of the hammer drill 2 and the dust collector 7 are now described with reference to FIG. 2.

The hammer drill 2 has the control circuit 50, a drive circuit 51 and a current-detecting-amplifier 55 which are mounted on the board of the controller 5. Further, a hall sensor 53, the switch 263, the speed-change-dial unit 231, the acceleration sensor unit 61 (the control circuit 610) and the connector 59 are electrically connected to the control circuit 50.

In the present embodiment, the control circuit 50 is formed by a microcomputer including a CPU, a ROM, a RAM and a timer. The drive circuit 51 includes a three-phase bridge circuit using six semiconductor switching elements. The current-detecting-amplifier 55 converts current flowing through the driving motor 31 into voltage by shunt resistance and further outputs a signal amplified by the amplifier to the control circuit 50. The hall sensor 53 has three hall elements which are arranged corresponding to respective phases of the driving motor 31, and outputs a signal indicating a rotation position of the rotor to the control circuit 50. As described above, the switch 263 outputs to the control circuit 50 a trigger signal corresponding to the operation amount of the trigger 261 in response to a depressing operation of the trigger 261. The speed-change-dial unit 231 outputs to the control circuit 50 a signal corresponding to the rotation speed set via a turning operation of the dial. The control circuit 610 of the acceleration sensor unit 61 outputs to the control circuit 50 an acceleration signal corresponding to the vibration (acceleration) detected by the acceleration sensor 611.

The control circuit 50 starts or stops driving of the driving motor 31 based on various kinds of signals inputted from the hall sensor 53, the current-detecting-amplifier 55, the switch 263, the speed-change-dial unit 231 and the acceleration sensor unit 61. Further, the control circuit 50 appropriately sets the rotation speed of the driving motor 31 and then sets a drive duty ratio of each of the switching elements according to the rotation speed and outputs a control signal corresponding to the set drive duty ratio to the drive circuit 51. In this manner, the control circuit 50 controls driving of the driving motor 31.

The dust collector 7 has the control circuit 80 and a drive circuit 81 which are mounted on the board of the controller 8. Further, the connector 715 is electrically connected to the control circuit 80. In the present embodiment, like the control circuit 50, the control circuit 80 is formed by a microcomputer including a CPU, a ROM, a RAM and a timer. The drive circuit 81 has a switching element.

As described above, when the dust collector 7 is attached to the body housing 21, the control circuit 80 is electrically connected to the control circuit 50 of the hammer drill 2 via the connectors 715 and 59. The control circuit 50 outputs at least a trigger signal from the switch 263 to the control circuit 80, while the control circuit 50 is connected to the control circuit 80. The control circuit 80 starts and stops driving of the dust-collection motor 711 by switching on and off the switching element of the drive circuit 81. Further, the control circuit 80 appropriately sets the rotation speed of the dust-collection motor 711 and supplies current set according to the set rotation speed to the switching element. In this manner, the control circuit 80 controls driving of the dust-collection motor 711.

Operation control in the dust collecting system 1 is now described. Further, in the present embodiment, driving of the driving motor 31 of the hammer drill 2 is controlled by the control circuit 50 of the hammer drill 2, while driving of the dust-collection motor 711 of the dust collector 7 is separately controlled by the control circuit 80 of the dust collector 7.

First, control of the driving motor 31 by the control circuit 50 (more specifically, CPU) of the hammer drill 2 is described.

In the present embodiment, the control circuit 50 is configured to perform so-called soft-no-load control (also referred to as no-load low-speed rotation control) for the driving motor 31. The soft-no-load control refers to a driving control method in which when the switch 263 is in the ON state, the rotation speed of the driving motor 31 is limited to a preset relatively low rotation speed (hereinafter referred to as an initial rotation speed) or less in an unloaded state, in which load is not applied to the tool accessory 91, while the rotation speed of the driving motor 31 is allowed to exceed the initial rotation speed in a loaded state. The soft-no-load control can reduce wasteful power consumption of the driving motor 31 in the unloaded state. In the present embodiment, the loaded state and the unloaded state are discriminated from each other, based on whether or not the vibration (acceleration) detected by the acceleration sensor 611 exceeds a specified threshold. The control circuit 50 controls the rotation speed of the driving motor 31 based on whether the acceleration signal outputted from the control circuit 610 of the acceleration sensor unit 61 is a signal indicating the unloaded state or a signal indicating the loaded state.

In the present embodiment, the rotation speed which is set with the speed-change-dial unit 231 is used as a rotation speed (i.e. maximum rotation speed) to be set corresponding to the maximum operation amount of the trigger 261. The rotation speed of the driving motor 31 is set based on the maximum rotation speed and the actual operation amount (percentage) of the trigger 261.

Specifically, when the switch 263 is turned on, the control circuit 50 monitors acceleration signals from the acceleration sensor 611. In the unloaded state of the hammer drill 2, in a case where the rotation speed which is calculated based on the maximum rotation speed and the operation amount of the trigger 261 is not more than the initial rotation speed, the control circuit 50 drives the driving motor 31 at the calculated rotation speed. On the other hand, in a case where the calculated rotation speed exceeds the initial rotation speed in the unloaded state, the control circuit 50 drives the driving motor 31 at the initial rotation speed. Further, after the hammer drill 2 shifts from the unloaded state to the loaded state, the control circuit 50 drives the driving motor 31 at the rotation speed which is calculated based on the maximum rotation speed and the operation amount of the trigger 261. When the depressing operation of the trigger 261 is released and the switch 263 is turned off, the control circuit 50 stops driving of the driving motor 31.

Next, control of the dust-collection motor 711 by the control circuit 80 (more specifically, CPU) of the dust collector 7 is described.

In the present embodiment, the control circuit 80 is configured to control the rotation speed of the dust-collection motor 711 according to the driving state of the hammer drill 2. The driving state of the hammer drill 2 may refer to, for example, a driving state (such as whether being driven or not and the rotation speed) of the driving motor 31 or the driving mechanism 35, a motion state (such as a vibration state and a rotation state) of the hammer drill 2 (specifically, the body housing 21). If the driving state of the hammer drill 2 changes, the generation state of dust may also change. Therefore, the control circuit 80 is configured to control the rotation speed of the dust-collection motor 711 according to the driving state of the hammer drill 2, so that the dust collecting power of the dust collector 7 can be changed to appropriately cope with a situation where dust is easily generated and a situation where dust is not easily generated.

Examples of the driving state of the hammer drill 2 which may be adopted in the present embodiment and control of the rotation speed of the dust-collection motor 711 according to the driving state are now described.

A first example is now described in which the rotation speed of the driving motor 31 is used as the driving state of the hammer drill 2. In this example, the control circuit 80 is configured to change the rotation speed of the dust-collection motor 711 according to the rotation speed of the driving motor 31. Specifically, while the switch 263 is in the ON state, the control circuit 50 of the hammer drill 2 outputs a signal (hereinafter referred to as a speed signal) indicating the rotation speed of the driving motor 31 to the control circuit 80 of the dust collector 7 via the connectors 59 and 715. The speed signal may be a signal indicating the rotation speed set by the control circuit 50, or a signal indicating the actual rotation speed of the driving motor 31 which is determined by an output signal from the hall sensor 53. The control circuit 50 sets the rotation speed of the dust-collection motor 711 based on a predetermined correspondence between the rotation speed of the driving motor 31 and the rotation speed of the dust-collection motor 711. Information defining the correspondence (hereinafter referred to as correspondence information) may be stored in advance, for example, in the ROM of the control circuit 80.

Figure 3:
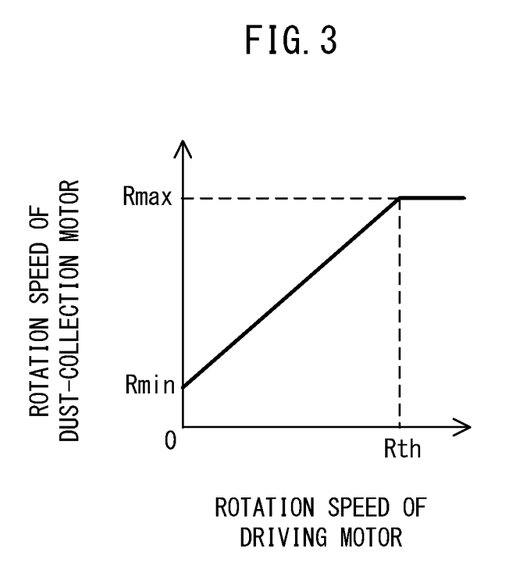
FIG. 3 is a graph schematically showing an example of a correspondence between the rotation speed of a driving motor and the rotation speed of a dust-collection motor.

FIG. 3 schematically shows an example of the correspondence information which can be adopted in the first example. In this example, it is defined that the rotation speed of the dust-collection motor 711 proportionally (linearly) increases from a minimum rotation speed (Rmin) to a maximum rotation speed (Rmax) as the rotation speed of the driving motor 31 increases. Further, it is defined that the rotation speed of the dust-collection motor 711 is kept constant at the maximum rotation speed (Rmax) when the rotation speed of the driving motor 31 exceeds a specified threshold (Rth). While the switch 263 is in the ON state, the control circuit 80 monitors speed signals from the control circuit 50 and sets the rotation speed of the dust-collection motor 711 according to the rotation speed of the driving motor 31 with reference to the correspondence information, and drives the dust-collection motor 711 at the set rotation speed. When the switch 263 is turned off, the control circuit 80 stops driving of the dust-collection motor 711.

As described above, in the dust collecting system 1 of the first example, the control circuit 80 of the dust collector 7 can change the rotation speed of the dust-collection motor 711 according to the change in the rotation speed of the driving motor 31, which may cause a change in the generation state of dust, and thereby change the dust collecting power of the dust collector. Particularly, the control circuit 80 increases the rotation speed of the dust-collection motor 711 as the rotation speed of the driving motor 31 increases. Therefore, when the rotation speed of the driving motor 31 is relatively low and the amount of dust generation is expected to be relatively small, power consumption of the dust-collection motor 711 can be suppressed, and when the amount of dust generation is expected to increase as the rotation speed of the driving motor 31 increases, the dust collecting power of the dust collector 7 can be increased.

The correspondence between the rotation speeds of the driving motor 31 and the dust-collection motor 711 is not limited to the example shown in FIG. 3. For example, it may be defined that the rotation speed of the dust-collection motor 711 is set to be a relatively low constant speed until the rotation speed of the driving motor 31 reaches a threshold Rth, and to be a higher constant speed when the rotation speed of the driving motor 31 exceeds the threshold Rth. Alternatively, for example, it may be defined that the rotation speed of the dust-collection motor 711 increases in a quadratic curve (non-linearly) or stepwise from the minimum rotation speed Rmin to the maximum rotation speed Rmax, according to the increase in the rotation speed of the driving motor 31.

A second example is now described in which the driving time of the driving motor 31 is adopted as the driving state of the hammer drill 2. In this example, the control circuit 80 (more specifically, CPU) is configured to change the rotation speed of the dust-collection motor 711 according to the driving time of the driving motor 31. The driving time of the driving motor 31 here refers to the duration of driving of the driving motor 31 from start of driving of the driving motor 31. In this case, the control circuit 80 (CPU) recognizes that driving of the driving motor 31 is started when the switch 263 is turned on, and measures the driving time by using the timer. Then, the control circuit 80 sets the rotation speed of the dust-collection motor 711 based on a predetermined correspondence between the driving time and the rotation speed of the dust-collection motor 711. Like in the above-described first example, information defining the correspondence may be stored in advance, for example, in the ROM of the control circuit 80.

Figure 4:
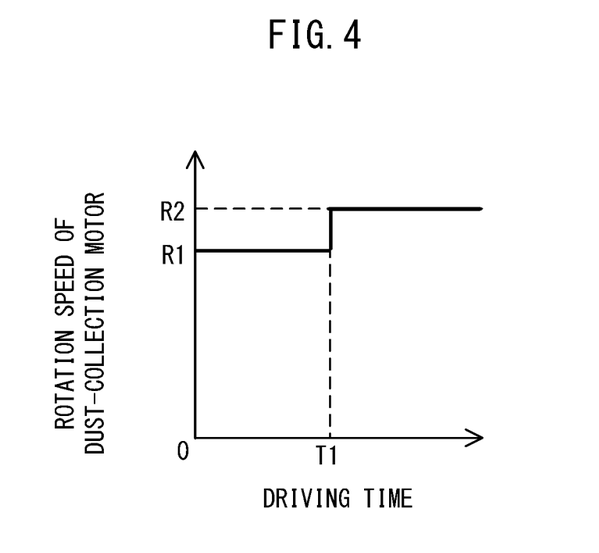
FIG. 4 is a graph schematically showing an example of a correspondence between a driving time of the driving motor and the rotation speed of the dust-collection motor.

FIG. 4 schematically shows an example of the correspondence information which can be adopted in the second example. In the example shown in FIG. 4, it is defined that the rotation speed of the dust-collection motor 711 is kept at a rotation speed R1 until the driving time reaches a specified threshold T1. It is further defined that the rotation speed is changed to a rotation speed R2 when the driving time exceeds the threshold T1. The rotation speed R2 is higher than the rotation speed R1. While the switch 263 is in the ON state, the control circuit 80 monitors the driving time measured with the timer and sets the rotation speed of the dust-collection motor 711 according to the driving time with reference to the correspondence information, and drives the dust-collection motor 711 at the set rotation speed. When the switch 263 is turned off, the control circuit 80 stops driving of the dust-collection motor 711.

As described above, in the second example, the control circuit 80 of the dust collector 7 can change the rotation speed of the dust-collection motor 711 according to the change in the driving time of the driving motor 31, which may cause a change in the generation state of dust, and thereby change the dust collecting power of the dust collector. Particularly, the control circuit 80 increases the rotation speed of the dust-collection motor 711 when the driving time exceeds the threshold T1. Therefore, when the driving time of the driving motor 31 is relatively short and the amount of dust generation is expected to be relatively small, power consumption of the dust-collection motor 711 can be suppressed, and when the amount of dust generation is expected to increase as the driving time of the driving motor 31 increases to some extent, the dust collecting power can be increased.

The correspondence between the driving time and the rotation speed of the dust-collection motor 711 is not limited to the example shown in FIG. 4. For example, it may be defined that the rotation speed of the dust-collection motor 711 increases linearly, non-linearly or stepwise to the maximum rotation speed Rmax as the driving time increases.

Figure 5:
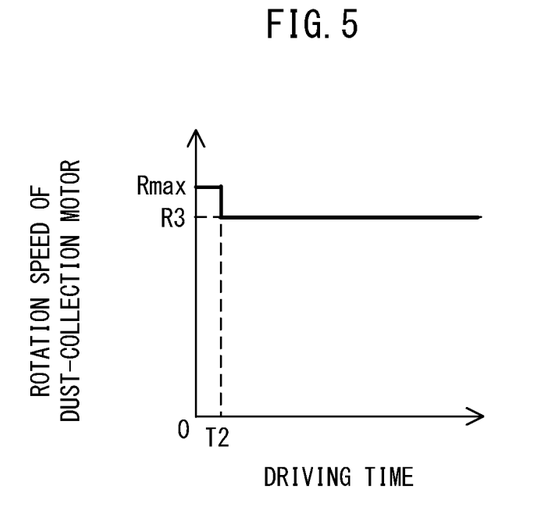
FIG. 5 is a graph schematically showing an example of a correspondence between the driving time of the driving motor and the rotation speed of the dust-collection motor.

Alternatively, like in a modified example shown in FIG. 5, it may be defined that the rotation speed of the dust-collection motor 711 is set to be the maximum rotation speed Rmax until the driving time reaches a specified threshold T2 and to be reduced to a rotation speed R3 when the driving time exceeds the threshold T2. In other words, the control circuit 80 may be configured to drive the dust-collection motor 711 at high speed only for a specified time from start of driving of the driving motor 31. When the driving motor 31 and the dust-collection motor 711 start driving substantially at the same timing, start of dust suction may slightly lag behind start of the processing operation. According to this modified example, even in such a case, dust generated at the start of the processing operation can be effectively collected. In order to suppress wasteful power consumption of the dust-collection motor 711 while effectively collecting dust, it may be preferable that the threshold T2 of this modified example is set to a relatively small value (for example, about 5 seconds).

Further, this modified example may be combined with the example shown in FIG. 4. Specifically, the rotation speed of the dust-collection motor 711 may be reduced from the maximum rotation speed Rmax to the rotation speed R3 when the driving time exceeds the threshold T2, and then increased to the rotation speed R2 when the driving time exceeds the threshold T1.

Further, for example, the control circuit 80 (more specifically, CPU) may be configured to stop the dust-collection motor 711 (in other words, to change the rotation speed of the dust-collection motor 711 to zero) at a timing which is set according to the driving time of the driving motor 31. The timing may be set by providing a standby time according to the driving time of the driving motor 31. The standby time is a time period which is provided between stop of driving of the driving motor 31 and stop of driving of the dust-collection motor 711. Specifically, the control circuit 80 (CPU) measures the driving time like in the above-described example, and sets the standby time based on a predetermined correspondence between the driving time and the standby time when recognizing that the switch 263 is turned off and the driving of the driving motor 31 is stopped. Like in the above-described second example, information defining the correspondence may be stored in advance, for example, in the ROM of the control circuit 50. Further, the control circuit 50 measures an elapsed time from stop of driving of the driving motor 31 by using the timer and stops driving of the dust-collection motor 711 when the elapsed time reaches the set standby time.

Figure 6:
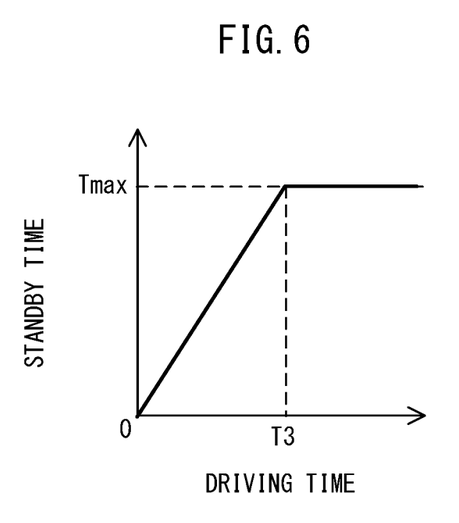
FIG. 6 is a graph schematically showing an example of a correspondence between the driving time of the driving motor and a standby time after the driving motor is stopped.

FIG. 6 schematically shows an example of the correspondence information which can be adopted in this modified example. In the example shown in FIG. 6, it is defined that the standby time proportionally (linearly) increases from zero to an upper limit time Tmax as the driving time increases until the driving time reaches a specified threshold T3. It is further defined that the standby time is kept constant at the upper limit time Tmax when the driving time exceeds the threshold T3. The control circuit 50 sets the standby time according to the driving time of the driving motor 31 with reference to the correspondence information, and stops driving of the dust-collection motor 711 (changes the rotation speed to zero) when the set standby time elapses.

Even when driving of the driving motor 31 is stopped and the processing operation is completed, the dust generated during the processing operation may be left without being completely collected. To cope with this problem, in this modified example, the control circuit 80 of the dust collector 7 provides the standby time according to the driving time of the driving motor 31, which may cause a change in the generation state of dust, so that dust remaining at the time of completion of the processing operation can be effectively collected. Particularly, the control circuit 80 sets the standby time to be longer as the driving time increases. Therefore, when the driving time is relatively short and the possibility of existence of remaining dust is expected to be lower, power consumption of the dust-collection motor 711 can be suppressed, and when the possibility of existence of remaining dust is expected to be higher, the dust collecting power of the dust collector 7 can be increased.

The correspondence between the driving time and the standby time is not limited to the example shown in FIG. 6. For example, it may be defined that the standby time is kept constant at a relatively short time until the driving time reaches the threshold T3, while being kept constant at a relatively longer time when the driving time exceeds the threshold T3. Alternatively, it may be defined that the standby time increases non-linearly or stepwise up to the upper limit time Tmax as the driving time increases.

A third example is now described in which vibration (acceleration) of the hammer drill 2 is adopted as the driving state of the hammer drill 2. As described above, acceleration detected by the acceleration sensor 611 is a physical quantity which indicates vibration of the hammer drill 2 and is also a physical quantity which indicates load on the tool accessory 91. Therefore, the third example can be rephrased as an example in which load on the tool accessory 91 is adopted as the driving state of the hammer drill 2. In this example, the control circuit 80 (more specifically, CPU) is configured to change the rotation speed of the dust-collection motor 711 according to the vibration (load). In this case, the control circuit 50 of the hammer drill 2 is configured to output an acceleration signal from the acceleration sensor 611 to the control circuit 80. Then, the control circuit 80 (CPU) sets the rotation speed of the dust-collection motor 711 based on a predetermined correspondence between the acceleration and the rotation speed of the dust-collection motor 711. Like in the above-described examples, information defining the correspondence may be stored in advance, for example, in the ROM of the control circuit 80.

Figure 7:
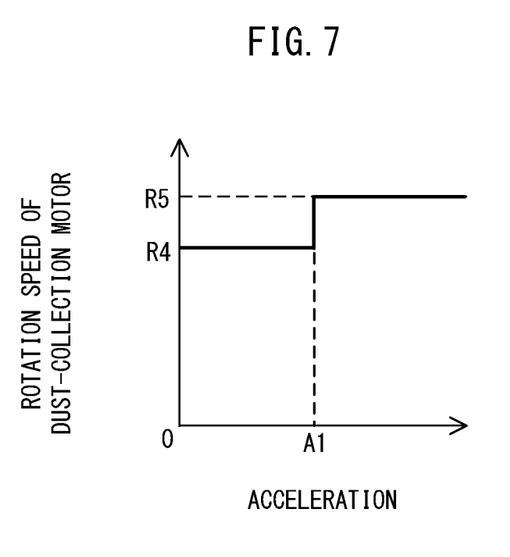
FIG. 7 is a graph schematically showing an example of a correspondence between the acceleration and the rotation speed of the dust-collection motor.

FIG. 7 schematically shows an example of the correspondence information which can be adopted in the third example. In the example shown in FIG. 7, it is defined that the rotation speed of the dust-collection motor 711 is kept at a rotation speed R4 until the acceleration indicated by the acceleration signal reaches a specified threshold A1. It is further defined that the rotation speed of the dust-collection motor 711 is changed to a rotation speed R5 when the acceleration exceeds the threshold A1. The rotation speed R5 is higher than the rotation speed R4. While the switch 263 is in the ON state, the control circuit 80 monitors acceleration signals from the control circuit 50 and sets the rotation speed of the dust-collection motor 711 according to the detected acceleration with reference to the correspondence information, and drives the dust-collection motor 711 at the set rotation speed. When the switch 263 is turned off, the control circuit 80 stops driving of the dust-collection motor 711.

As described above, in the third example, the control circuit 80 of the dust collector 7 can change the rotation speed of the dust-collection motor 711 according to the change in the vibration (load), which may cause a change in the generation state of dust, and thereby change the dust collecting power of the dust collector. Particularly, the control circuit 80 increases the rotation speed of the dust-collection motor 711 as the vibration (load) increases. Therefore, when the vibration (load) is relatively small, power consumption of the dust-collection motor 711 can be suppressed, and when the vibration (load) is relatively large, the dust collecting power of the dust collector 7 can be increased.

The correspondence between the acceleration and the rotation speed of the dust-collection motor 711 is not limited to the example shown in FIG. 7. For example, it may be defined that the rotation speed of the dust-collection motor 711 increases linearly, non-linearly or stepwise as the acceleration increases.

Further, as described above, the control circuit 50 of the hammer drill 2 discriminates between the unloaded state and the loaded state based on the detected acceleration and accordingly performs the soft-no-load control. Therefore, the control circuit 80 may be configured to further change the rotation speed of the dust-collection motor 711 in conjunction with the soft-no-load control of the control circuit 50.

In this modified example, for example, a threshold of acceleration which is used in the soft-no-load control to discriminate between the unloaded state and the loaded state may be adopted as the threshold A1 in the example of FIG. 7. Further, like the rotation speed of the driving motor 31, the rotation speed of the dust-collection motor 711 may be set to a speed not exceeding a specified initial rotation speed according to the operation amount of the trigger 261 until the acceleration reaches the threshold A1, while being set to a higher speed than the initial rotation speed according to the operation amount of the trigger 261 when the acceleration exceeds the threshold A1. This modified example may be equivalent to a case in which the rotation speed of the dust-collection motor 711 is changed according to the rotation speed of the driving motor 31. It is noted that the initial rotation speed of the dust-collection motor 711 may be set separately from the initial rotation speed of the driving motor 31.

As described above, according to this modified example, acceleration (vibration) detected by the acceleration sensor 611 is effectively used for both the soft-no-load control of the driving motor 31 and the control of the dust-collection motor 711. Further, the control circuit 80 can change the rotation speed of the dust-collection motor 711 in conjunction with the change in the rotation speed of the driving motor 31, so that the dust collecting power of the dust collector 7 can be appropriately changed according to whether it is in the unloaded state or in the loaded state.

The above-described first to third examples and modified examples of the control of the dust-collection motor 711 may be used separately or in appropriate combination.

Correspondences between the features of the above-described embodiment and the features of the invention are as follows. It is noted, however, that the features of the above-described embodiment are mere examples which are non-limiting. The dust collecting system 1 is an example of the "dust collecting system". The hammer drill 2 is an example of the "power tool". The tool accessory 91 is an example of the "tool accessory". The dust collector 7 is an example of the "dust collector". The driving motor 31 and the driving mechanism 35 are examples of the "first motor" and the "driving mechanism", respectively. The dust-collection motor 711, the fan 713 and the control circuit 80 are examples of the "second motor", the "fan" and the "first control device", respectively. The control circuit 50 or the hall sensor 53 is an example of the "speed-detecting device". The timer of the control circuit 80 is an example of the "time-measuring device". The acceleration sensor 611 is an example of the "load-detecting device". The body housing 21 is an example of the "body housing". The control circuit 50 of the hammer drill 2 is an example of the "second control device".

The above-described embodiment is a mere example, and the dust collecting system according to the present invention is not limited to the structure of the dust collecting system 1 (the hammer drill 2 and the dust collector 7) of the above-described embodiment. For example, the following modifications may be made. Further, one or more of these modifications may be applied in combination with the dust collecting system 1 of the above-described embodiment or with the claimed invention.

In the above-described embodiment, the hammer drill 2 is described as an example of the power tool which is configured to perform processing operation by driving a tool accessory. The power tool which can be adopted in the dust collecting system 1 is not, however, limited to the hammer drill 2, but any power tool may be adopted which is used for processing operation (such as drilling and chipping) by which dust may be generated. For example, an electric hammer, a vibration drill and an electric drill may be adopted in place of the hammer drill 2. Further, a hammer drill having only a hammer drill mode and a hammer mode may be adopted.

In the above-described embodiment, the acceleration sensor 611 is adopted as a detecting device for detecting vibration of the hammer drill 2, but a different sensor (such as a speed sensor, a displacement sensor or the like) which is capable of detecting vibration may also be adopted.

In the above-described embodiment, the acceleration sensor 611 is also used as a detecting device for detecting load on the tool accessory 91. However, the detecting device for detecting the load is not limited to the acceleration sensor 611.

For example, in the hammer drill 2, when the tool accessory 91 is pressed against a workpiece, the handle 25 moves forward relative to the body housing 21. Therefore, the load may be detected by a position sensor for detecting movement of the handle 25 relative to the body housing 21. As such a position sensor, for example, a sensor of a non-contact type (such as a magnetic-field-detection type and an optical type) or a contact type detecting mechanism (such as a mechanical switch) may be adopted. Further, some power tools have a movable unit configured to move rearward together with the tool accessory 91 relative to the body housing 21, in response to pressing of the tool accessory 91 against a workpiece. In this case, the position sensor may also be used. Further, a detecting device (such as a force sensor) for detecting forward pressing force may be provided on a grip part to be held by a user. A drilling tool may be provided with a detecting device (such as a force sensor) for detecting rearward pressing force of a spindle which is configured to rotationally drive the tool accessory. Alternatively or additionally, the load may be detected from the load current of the driving motor 31 or the temperature change of the battery 93.

Plural kinds of information (index values, physical quantities) corresponding to the load on the tool accessory 91 may be detected and used for control of the rotation speed of the dust-collection motor 711. For example, separate detecting devices (such as an acceleration sensor and a position sensor) may be provided to respectively detect vibration and other load. In this case, the rotation speed of the dust-collection motor 711 may be controlled based on detection results of the both detecting devices.

In the present embodiment, acceleration, which is a physical quantity which indicates the vibration and load on the tool accessory 91, is also used for soft no-load control processing of the driving motor 31. However, the control circuit 80 may be configured to change the rotation speed of the dust-collection motor 711 according to the vibration or other load, regardless of whether or not the soft no-load control processing is performed. Further, the control circuit 50 need not perform the soft-no-load control. For example, the control circuit 50 may drive the driving motor 31 simply at a rotation speed set according to the operation amount of the trigger 261, or at a constant rotation speed.

In the above-described embodiment, when the switch 263 is turned on, the control circuit 50 of the hammer drill 2 and the control circuit 80 of the dust collector 7 respectively start driving of the driving motor 31 and the dust-collection motor 711. In other words, the control circuits 50 and 80 start driving of the driving motor 31 and the dust-collection motor 711 substantially at the same timing. However, the control circuits 50 and 80 may start or stop driving of the driving motor 31 and the dust-collection motor 711 at different timings.

Figure 8:
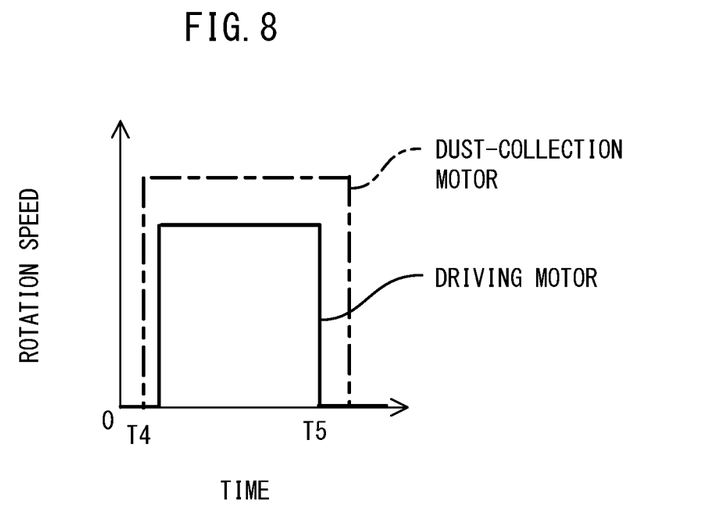
FIG. 8 is a graph schematically showing the timings of start and stop of the driving motor and the dust-collection motor.

For example, as shown in FIG. 8, the control circuit 80 of the dust collector 7 may start driving of the dust-collection motor 711 before the control circuit 50 of the hammer drill 2 starts driving of the driving motor 31, and stop driving of the dust-collection motor 711 after the driving of the driving motor 31 is stopped. Specifically, the control circuit 50 starts driving of the driving motor 31 when a specified time elapses after the switch 263 is turned on at time T4, and stops driving of the driving motor 31 immediately when the switch 263 is turned off at time T5. Meanwhile, the control circuit 80 immediately starts driving of the dust-collection motor 711 at time T4 and stops driving of the dust-collection motor 711 when a specified time elapses from time T5. In this case, dust generated at the start of the processing operation can be effectively collected, and dust remaining after completion of the processing operation can be more reliably collected.

In the above-described embodiment, the control circuit 50 of the hammer drill 2 and the control circuit 80 of the dust collector 7 respectively control driving of the driving motor 31 and driving of the dust-collection motor 711, independently from each other. However, for example, the control circuit 50 of the hammer drill 2 may perform both of the above-described drive control processings of the driving motor 31 and the dust-collection motor 711, or the above-described drive control processings of the driving motor 31 and the dust-collection motor 711 may be distributed to a plurality of control circuits. In the above-described embodiment, the control circuits 50 and 80 are described which are each formed by a microcomputer including a CPU. However, the control circuits 50 and 80 may be formed, for example, by a programmable logic device such as an ASIC (Application Specific Integrated Circuit) and an FPGA (Field Programmable Gate Array).

The structures of the body housing 21 and the handle 25 of the hammer drill 2 and a connecting structure therefor, and the internal structure (including the driving motor 31, the driving mechanism 35 and the controller 5) of the hammer drill 2 and its arrangement may be appropriately changed. For example, the driving motor 31 may be a motor with a brush or an alternate current (AC) motor. As the driving mechanism 35, a motion-converting mechanism with a crank mechanism may be adopted, in place of the motion-converting mechanism with the swinging member.

The battery-mounting part 245 may be provided in the body housing 21 instead of being provided in the handle 25. Further, one or three or more battery-mounting parts 245 may be provided. In other words, the number of the batteries 93 which can be mounted to the hammer drill 2 is not limited to two. Further, the hammer drill 2 may be configured to be connected to an external AC power source.

The structure of the dust collector 7 may also be appropriately changed. For example, the shapes and the arrangement of the body housing 70, the sliding part 75 and the dust-transfer passage 77, the attaching/detaching structure of the dust collector 7 relative to the hammer drill 2, and the structures of the dust-collection motor 711 and the fan 713 may be appropriately changed. For example, the dust-collection motor 711 may be a brushless motor. Further, in a structure in which the control circuit 50 of the hammer drill 2 controls driving of the driving motor 31 and driving of the dust-collection motor 711 as described above, the controller 8 may have only the drive circuit 81 without having the control circuit 80.

In view of the nature of the present invention and the above-described embodiment, the following features are provided. The following features can be used in combination with one or more of the above-described embodiment and its modifications and the claimed invention.

(Aspect 1)

The dust collector is configured to be removably attached to the power tool, and the power tool and the dust collector have respective connectors configured to electrically connect each other when the dust collector is attached to the power tool.

Further, Aspects 2 and 3 are provided for the purpose of effectively collecting dust generated at the start of the processing operation. Aspects 2 and 3 may be adopted independently or in combination with one or more of the above-described embodiment and its modifications, Aspect 1 and the claimed invention.

(Aspect 2)

A dust collecting system including a power tool configured to perform processing operation on a workpiece by driving a tool accessory and a dust collector configured to collect dust generated by the processing operation, wherein:
the power tool comprises:
a first motor;
a driving mechanism configured to drive the tool accessory by power of the first motor; and
an operation member configured to be externally operated by a user,
the dust collector comprises:
a second motor; and
a fan configured to be rotationally driven by the second motor to generate air flow for collecting dust,
the dust collecting system comprises:
a first control device configured to control driving of the first motor; and
a second control device configured to control driving of the second motor,
the second control device is configured to start driving of the second motor in response to an operation of the operation member, and
the first control device is configured to start driving of the first motor after start of driving of the second motor.

According to the present aspect, driving of the tool accessory is started to perform processing operation after driving of the second motor for collecting dust is started. Therefore, the dust collector can effectively collect dust generated at the start of the processing operation. The first control device may be provided in either the power tool or the dust collector. The second control device may also be provided in either the power tool or the dust collector. The second control device may be provided separately from the first control device, or the first control device may also serve as the second control device.

The control circuit 50 (specifically, CPU) and the control circuit 80 (specifically, CPU) of the above-described embodiment are examples of the "first control device" and the "second control device", respectively, according to the present aspect.

(Aspect 3)

The dust collecting system as defined in Aspect 2, wherein;
the first control device is configured to stop driving of the first motor in response to releasing of the operation member, and
the second control device is configured to stop driving of the second motor after driving of the first motor is stopped.

DESCRIPTION OF THE NUMERALS

1: dust collecting system, 2: hammer drill, 21: body housing, 22: driving-mechanism-housing part, 23: motor-housing part, 231: speed-change-dial unit, 24: controller-housing part, 245: battery-mounting part, 25: handle, 26: grip part, 261: trigger, 263: switch, 28: upper connection part, 281: elastic member, 29: lower connection part, 291: support shaft, 31: driving motor, 311: motor shaft, 35: driving mechanism, 39: tool holder, 5: controller, 50: control circuit, 51: drive circuit, 53: hall sensor, 55: current-detecting-amplifier, 59: connector, 61: acceleration sensor unit, 610: control circuit, 611: acceleration sensor, 7: dust collector, 70: body housing, 701: sliding-guide part, 703: connector part, 705: motor-housing part, 711: dust-collection motor, 713: fan, 715: connector, 73: dust case, 735: filter, 75: sliding part, 751: first tubular part, 752: second tubular part, 753: cover part, 754: suction port, 77: dust-transfer passage, 771: hose, 772: spring, 775: hose-connecting part, 8: controller, 80: control circuit, 81: drive circuit, 91: tool accessory, 93: battery, A1: driving axis

What is claimed is:

1. A dust collecting system including a power tool configured to perform a processing operation on a workpiece by driving a tool accessory and a dust collector configured to collect dust generated by the processing operation, wherein:
the power tool comprises:
a first motor; and
a driving mechanism configured to drive the tool accessory by power of the first motor;
the dust collector comprises:
a second motor; and
a fan configured to be rotationally driven by the second motor to generate air flow for collecting the dust;
the dust collecting system comprises a first control device configured to change a rotation speed of the second motor according to a driving time of the first motor from a start of driving of the first motor; and
the first control device is configured to increase the rotation speed of the second motor as the driving time increases.

2. The dust collecting system as defined in claim 1, further comprising a time-measuring device configured to measure the driving time.

3. The dust collecting system as defined in claim 1, wherein the first control device is configured to drive the second motor at a first rotation speed until the driving time reaches a specified time from the start of driving of the first motor and to change the rotation speed of the second motor to a second rotation speed when the driving time reaches the specified time, the second rotation speed being lower than the first rotation speed.

4. The dust collecting system as defined in claim 1, further comprising:
a time-measuring device configured to measure the driving time; and
a memory that stores a correspondence relationship between (i) a length of the driving time and (ii) the rotation speed of the second motor;
wherein the first control device is configured to set the rotation speed of the second motor according to (i) the length of the driving time and (ii) the correspondence relationship.

5. A dust collecting system including a power tool configured to perform a processing operation on a workpiece by driving a tool accessory and a dust collector configured to collect dust generated by the processing operation, wherein:
the power tool comprises:
a first motor; and
a driving mechanism configured to drive the tool accessory by power of the first motor;
the dust collector comprises:
a second motor; and
a fan configured to be rotationally driven by the second motor to generate air flow for collecting the dust;

the dust collecting system comprises a first control device configured to change a rotation speed of the second motor according to a driving time of the first motor from a start of driving of the first motor;

the first control device is configured to change the rotation speed of the second motor to zero when a standby time elapses after driving of the first motor is stopped, the standby time being set according to the driving time of the first motor; and the first control device is configured to set the standby time to be longer as the driving time increases.

6. A dust collecting system including a power tool configured to perform a processing operation on a workpiece by driving a tool accessory and a dust collector configured to collect dust generated by the processing operation, wherein:

the power tool comprises:
   a first motor;
   a driving mechanism configured to drive the tool accessory by power of the first motor; and
   a load-detecting device configured to detect load on the tool accessory;

the dust collector comprises:
   a second motor; and
   a fan configured to be rotationally driven by the second motor to generate air flow for collecting dust; and the dust collecting system comprises a first control device configured to change a rotation speed of the second motor according to the load.

7. The dust collecting system as defined in claim 6, wherein the first control device is configured to increase the rotation speed of the second motor as the load increases.

8. The dust collecting system as defined in claim 6, wherein:

the load-detecting device is configured to detect at least vibration of the power tool as the load, and the first control device is configured to change the rotation speed of the second motor according to the vibration.

9. The dust collecting system as defined in claim 8, wherein the first control device is configured to increase the rotation speed of the second motor as the vibration increases.

10. The dust collecting system as defined in claim 8, wherein the power tool includes a body housing that houses the first motor, the driving mechanism and
the load-detecting device.

11. The dust collecting system as defined in claim 6, further comprising:

a second control device configured to control driving of the first motor, wherein:

the second control device is configured to control a rotation speed of the first motor not to exceed a specified upper-limit speed, in a case where the load is not more than a specified threshold, the second control device is configured to allow the rotation speed of the first motor to exceed the upper-limit speed, in a case where the load exceeds the threshold, and the first control device is configured to change the rotation speed of the second motor in conjunction with control of the first motor by the second control device.

12. The dust collecting system as defined in claim 11, wherein:

the first control device is in the dust collector, and
the second control device is in the power tool.

13. The dust collecting system as defined in claim 6, wherein the first control device is configured to change the rotation speed of the second motor according to a rotation speed of the first motor and a driving time of the first motor from a start of driving of the first motor.

14. The dust collecting system as defined in claim 13, wherein the first control device is configured to change the rotation speed of the second motor to zero when a standby time elapses after driving of the first motor is stopped, the standby time being set according to the driving time.

* * * * *